Dec. 7, 1965     J. J. TURNER     3,221,698

HYDROFOIL CONTROL SYSTEM

Filed Oct. 30, 1963     2 Sheets-Sheet 1

INVENTOR.
JAMES J. TURNER
BY *O. E. Hodges*

ATTY.

Dec. 7, 1965    J. J. TURNER    3,221,698
HYDROFOIL CONTROL SYSTEM
Filed Oct. 30, 1963    2 Sheets-Sheet 2

INVENTOR.
JAMES J. TURNER
BY *O.E. Hodges*
ATTY.

3,221,698
HYDROFOIL CONTROL SYSTEM
James J. Turner, 215 Fairfax Road, Alexandria, Va.
Filed Oct. 30, 1963, Ser. No. 320,232
1 Claim. (Cl. 114—66.5)
(Granted under Title 35, U.S. Code (1952), sec. 266)

The invention described herein may be manufactured and used by or for the Government of the United States of America for governmental purposes without the payment of any royalties thereon or therefor.

The present invention relates to a method and apparatus for controlling the operational depth of submergence in a fluid medium of a foil. More specifically, the invention relates to a method and apparatus for controlling the operating depth of a foil which automatically tends to correct deviations from a preset depth of operation of the foil.

In prior art devices it has been customary to "ventilate" hydrofoils to improve their performance under cavitating conditions, but such art has failed to recognize the possibility using "ventilation" to provide automatic correction for deviations from a predetermined hydrofoil operating depth.

Prior art also teaches the introduction of air to the surface of an airfoil to provide boundary layer control, but here again there is no teaching of operating depth control. In previous efforts to provide depth control for the hydrofoil, complicated sensing and servo control systems have been required. These efforts were usually directed at changing the attitude of the hydrofoil or of some control tab on the hydrofoil. Such control systems are both complicated and expensive when very fine control is attempted and have the attendant disadvantages associated with these two factors.

It is therefore the principal object of this invention to provide a control system for a foil which automatically tends to correct for changes in operating depth.

Another object of this invention is to provide a means of stabilization control for a foil stabilized craft.

A further object of this invention is to provide a simplified depth of operation control system for a foil.

Another object of this invention is to provide a foil operating depth control which is responsive to variations in the ambient pressure on the foil surface.

Other objects and many of the attendant advantages of this invention will be readily appreciated as the same becomes better understood by reference to the following detailed description when considered in connection with the accompanying drawings wherein.

Figure 8:
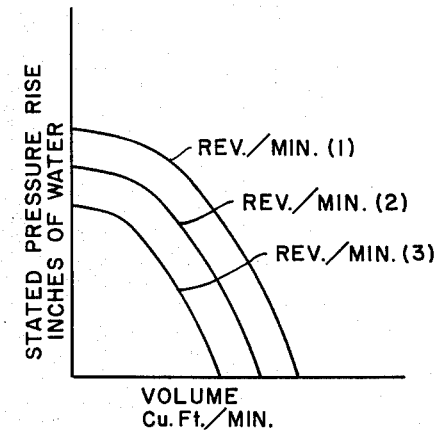

FIGS. 4, 5, 6, and 7 are views of some of the different versions of hydrofoils to which the invention may be applied;

FIG. 8 is a series of nondimensional curves showing fan characteristics at three arbitrarily selected speeds.

It is to be understood that this invention may be applied to boats, ships, amphibious aircraft and the like.

Figure 1:
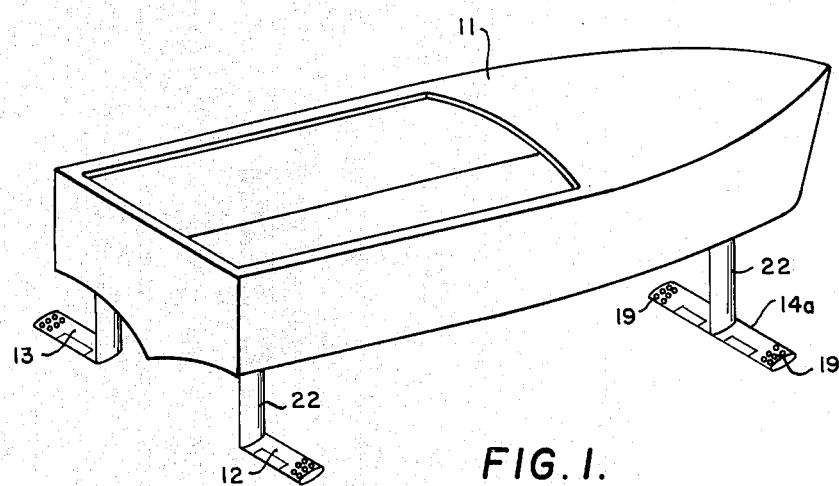
FIG. 1 is a diagrammatic view of a vehicle employing this invention.

Referring now to the drawings, wherein like reference characters designate like or corresponding parts throughout the several views, there is shown in FIG. 1 a vehicle, such as a boat 11 equipped with hydrofoils 12, having support members 22, and foil members 12, 13 and 14.

Figure 2:
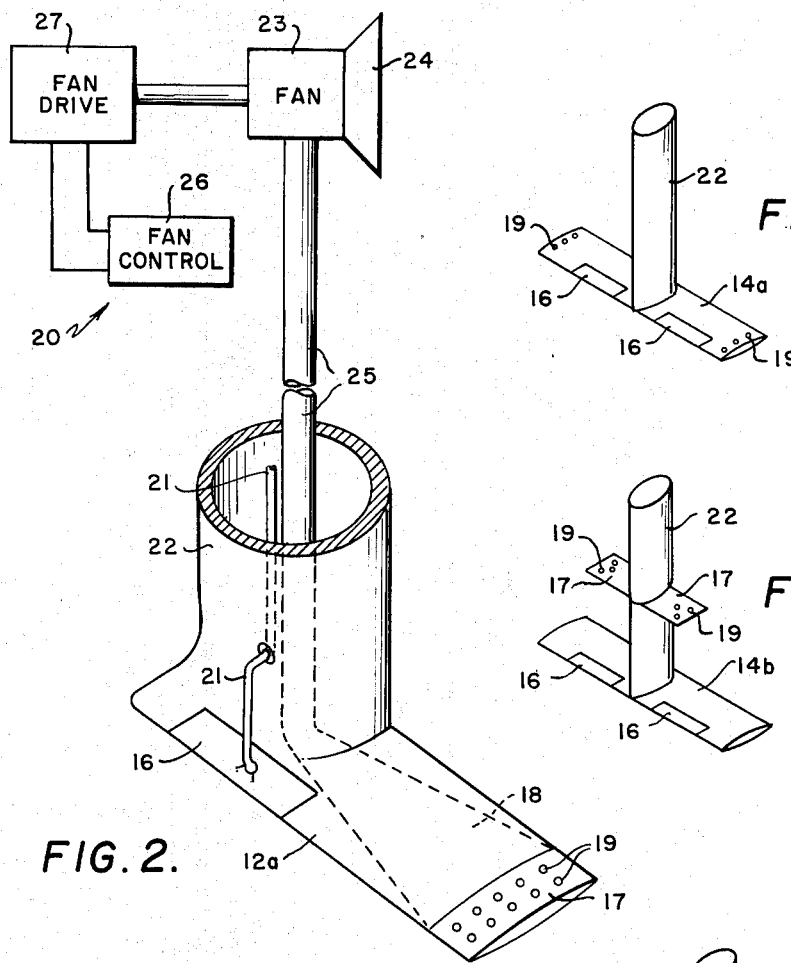
FIG. 2 is a diagrammatic view of the system of this invention as applied to a hydrofoil.

Such a vehicle is designed to have the hull raised out of the water and supported by the hydrofoils at high speeds. In such an arrangement, the area of the foil surface is directly related to the speed at which the boat will "plane" and is designed to support the boat hull a desired distance above the surface of the water, assuming that the water surface is planar. However, in practice the water surface is not usually planar, but contains waves of varying height. The waves in turn produce variations in the lifting forces of the hydrofoils. These changes in lifting forces require small adjustments of the hydrofoil to maintain the optimum performance of the vehicle. As previously mentioned such adjustments are usually accomplished by adjusting small tabs, such as tab 16, by means of a linkage 21 shown in FIG. 2. The tabs 16 shown in FIGS. 4 to 7 function similarly to that in FIG. 2. The frequent adjustments of these tabs required in normal operation persents the problem which applicant has solved. By adding a small additional area 17 to the hydrofoil 12a with a chamber 18 within the hydrofoil as shown in FIG. 2, to underlie the surface of the added area together with a plurality of small orifices or nozzles 19 in the upper surface of the added area of the hydrofoil 12a and a source of air or gas 20 which delivers the air or gas at a predetermined fixed pressure through a pipe system 25 within support 22 to be discharged through the orifices 19, applicant has produced a self-compensating means for adjusting the lift of the hydrofoils to produce stability of control during operation of the vehicle. This stability results from the spoilage effect of the escaping gas on the lift of the hydrofoil.

In operation, the pressure of the air source is set for a desired depth of operation of the hydrofoil. This results in more air being discharged through the orifices 19 when the hydrofoil depth decreases because of the decrease in external pressure at the shallower depth and a decrease in the air being discharged through orifices 19 when the depth of the hydrofoil increases. Such a source of air may include for example, a fan, compressor, blower, or other source of gas. When a fan 23 is used, it may have an air intake 24 and which discharges the air through pipe 25. Fans generally have the characteristic of delivering a volume of air which is inversely proportional to the static pressure rise within the usual operating range, as shown by the curves in FIG. 8. The fan is driven by a fan drive 27 which can be set to deliver the desired volume of air at the desired pressure.

Figure 4:
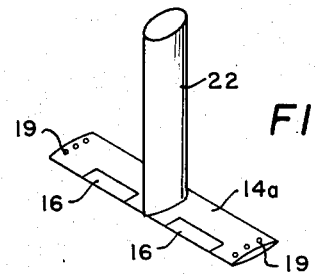
Figure 5:
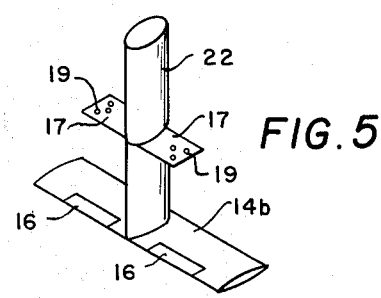
Figures 6, 7:
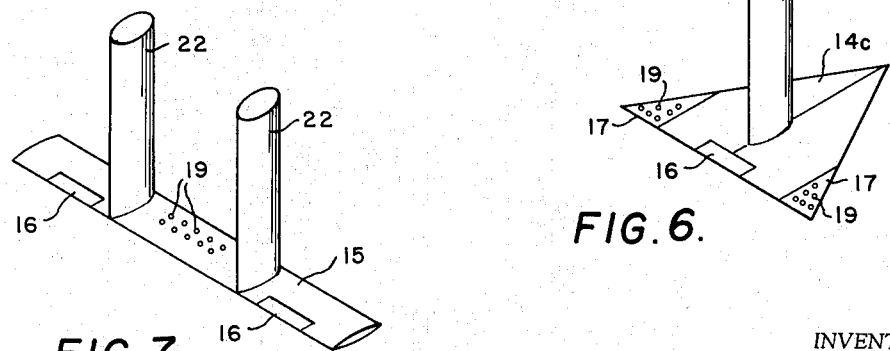

FIGS. 4 to 7 show the application of the present invention to various designs of hydrofoils. In FIG. 4 the nozzles 19 are located at the tips of a hydrofoil 14a having a center support. In FIG. 5 the nozzles are mounted on an additional small hydrofoil which provides the additional area 17 mounted on the center support of the main hydrofoil 14b. In FIG. 6 the nozzles are mounted on the corners of a triangular hydrofoil 14c. In FIG. 7 the nozzles are mounted between the double supports 22 of hydrofoil 15.

Figure 3:
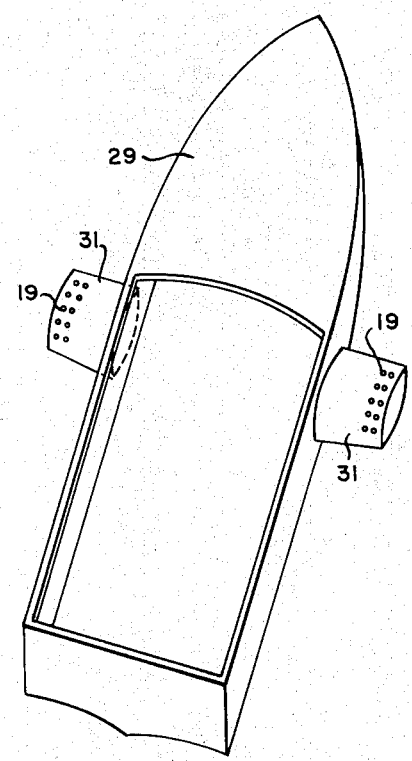
FIG. 3 is a diagrammatic representation of a craft having foil stabilization.

The system of this invention may be applied to stabilize a foil stabilized ship 29, such as that shown in FIG. 3 wherein the foils 31 may be equipped with nozzles 19 to automatically correct for ship roll by changing the lift of the respective foils. In this case both foils would, preferably be supplied air from a common source.

Obviously many modifications and variations of the present invention are possible in the light of the above teachings. It is therefore to be understood that within the scope of the appended claim the invention may be practiced otherwise than as specifically described.

What is claimed is:

A system for controlling the operation depth of hydrofoil comprising:
- a vehicle designed to be supported by the hydrofoils;
- essentially hollow hydrofoils mounted to support said vehicle when said vehicle is traveling at high speed;
- said hydrofoils each having located in the upper surfaces thereof a plurality of spoiler apertures whereby when air at sufficient pressure is passed therethrough, a cavitation bubble is formed;
- means mounted in said vehicle and fluidly coupled to said hollow hydrofoils for supplying air for passage through the apertures in said hydrofoils to form a cavitation bubble;
- said means comprising a fan whose gas discharge rate at any preselected fan speed is related to the depth of submergence of said hydrofoil and to the load response characteristic of said fans.

References Cited by the Examiner

UNITED STATES PATENTS

| | | | |
|---|---|---|---|
| 1,177,276 | 3/1916 | Ruhe | 114—67 |
| 1,222,674 | 4/1917 | Ruhe | 114—67 |
| 2,709,979 | 6/1955 | Bush et al. | 114—66.5 |
| 2,764,954 | 10/1956 | Oeltgen | 114—67.1 |
| 3,006,307 | 10/1961 | Johnson | 114—66.5 |
| 3,117,546 | 1/1964 | Von Schertel | 114—66.5 |

FOREIGN PATENTS

| | | |
|---|---|---|
| 295,255 | 8/1928 | Great Britain. |
| 549,266 | 10/1956 | Italy. |
| 1,129,080 | 5/1962 | Germany. |

MILTON BUCHLER, *Primary Examiner.*

FERGUS S. MIDDLETON, *Examiner.*